United States Patent [19]

Feuerbacher et al.

[11] 3,788,399

[45] Jan. 29, 1974

[54] METHOD FOR INHIBITING ADSORPTION OF SURFACTANT IN SECONDARY OIL RECOVERY

[75] Inventors: David George Feuerbacher, Bellaire; Mary Kay Hrncir Smith, Austin, both of Tex.

[73] Assignee: Texaco Inc., New York, N.Y.

[22] Filed: Dec. 30, 1971

[21] Appl. No.: 214,471

[52] U.S. Cl. ................................ 166/274, 166/273
[51] Int. Cl. ........................................... E21b 43/22
[58] Field of Search .... 166/271, 270, 273, 307, 274

[56] References Cited
UNITED STATES PATENTS

| | | | |
|---|---|---|---|
| 3,371,710 | 3/1968 | Harvey et al. | 166/274 X |
| 3,469,630 | 9/1969 | Hurd et al. | 166/273 X |
| 3,605,895 | 9/1971 | Jones | 166/273 |
| 3,369,602 | 2/1968 | Fallgatter et al. | 166/273 |
| 3,414,053 | 12/1968 | Treiber et al. | 166/273 |
| 3,175,610 | 3/1965 | Osoba | 166/270 |

*Primary Examiner*—Stephen J. Novosad
*Attorney, Agent, or Firm*—Thomas H. Whaley et al.

[57] ABSTRACT

A process for recovering petroleum from a subterranean reservoir by flooding with a surfactant wherein the adsorption of surfactant by the reservoir rock is inhibited by treating the reservoir with an aqueous preflush solution of a water soluble salt of a strong mineral acid having an oxygen containing anion prior to injecting the surfactant. Preferably, treatment is accomplished by injecting an aqueous solution of soluble nitrates, sulfates or phosphates into the reservoir in an amount sufficient to satisfy substantially all of the adsorption capacity of the reservoir matrix followed by injection of an aqueous solution of the surfactant. The preflush compound and the surfactant solution can be subsequently displaced through the formation by any convenient aqueous drive fluid including water.

14 Claims, No Drawings

METHOD FOR INHIBITING ADSORPTION OF SURFACTANT IN SECONDARY OIL RECOVERY

BACKGROUND OF THE INVENTION

This invention relates to the recovery of petroleum from a subterranean formation. More particularly, this invention relates to the recovery of petroleum from a subterranean formation by flooding the formation with water.

Petroleum is frequently recovered from subterranean formations or reservoirs in which it has accumulated by pumping or permitting the petroleum to flow to the surface through wells drilled into the subterranean formations. This process is referred to as primary recovery. A large amount of oil, generally in the range of 65 to 90 percent or more, is left in the subterranean formation at the conclusion of the primary recovery program. At the conclusion of the primary production recovery program, it is common practice to resort to some form of supplemental recovery technique in order to recover additional amounts of petroleum from the subterranean formation. These supplemental operations are frequently referred to as secondary recovery operations, although in fact they may be primary, secondary or tertiary in sequence of their employment.

The most widely used supplemental recovery operation involves the injection of an extraneous fluid such as water through injection wells drilled into the subterranean formation, so that the injected fluid displaces oil through the formation to be produced from production wells.

While water flooding is a useful supplemental recovery technique, water has a relatively poor displacement efficiency, largely due to the fact that water and oil are immiscible at reservoir conditions, and the high interfacial tension that exists between the flood water and oil. For this reason, a large proportion of the oil is still left unrecovered at the conclusion of a conventional waterflood.

It has been recognized by those skilled in the art of supplemental recovery techniques, that the inclusion of a surface active agent or surfactant in the flood water would reduce the interfacial tension between the injected fluid and the reservoir petroleum, thereby promoting displacement of the residual oil by the water more efficiently than is possible by using water alone. For example, U. S. Pat. No. 3,468,377 discloses the use of petroleum sulfonates in waterflood operations, and U. S. Pat. No. 3,553,130 discloses the use of ethylene oxide adducts of alkyl phenols for the same purpose. U. S. Pat. No. 2,233,381 teaches the use in water flooding operations of a water soluble, surface active, alkaline earth resistant polyglycol ether such as iso-octylphenyl polyglycol ether. Field operations employing such surface-active agents or surfactants in the injected fluid have not always been entirely satisfactory because surfactants are adsorbed by the formation rock to a relatively high degree, resulting in an ever declining concentration of surfactant with distance from the injection point. In order to maintain a sufficient concentration of the surfactant at the oil/water interface, it has been necessary to use a very large concentration of surfactant. Since waterflood operations typically involve enormous quantities of injected fluid, running into the hundreds of millions of gallons of water, the use of surfactants in sufficiently high concentrations to overcome this adsorption problem has usually not been economically feasible.

Another serious problem in any supplemental recovery operation in which an extraneous fluid such as water is injected into a subterranean petroleum containing formation to displace the petroleum or oil to the production means, is premature breakthrough of the injected fluid. Premature breakthrough is the breaking through of the injected or driving fluid at the production means before an adequate portion of the formation has been swept. This problem is frequently described in terms of sweep efficiency, to distinguish from the displacement efficiency described above. Displacement efficiency involves the microscopic, pore-by-pore efficiency by which water displaces oil, whereas sweep efficiency is related to the gross portions of the reservoir which are swept and unswept by the injected fluid. A major cause of poor sweep efficiency is associated with the fact that the injected fluid generally has a lower viscosity than the displaced fluid or petroleum. The greater the difference in viscosity of injected fluid and the viscosity of petroleum, the more pronounced will be the tendency toward premature breakthrough of the injected fluid, leaving a relatively large portion of the formation unswept.

Polymeric organic compounds which have the effect of increasing the viscosity of the injected fluid, thereby increasing the sweep efficiency of the supplemental recovery program, have been used in recent years. For example, U. S. Pat. No. 3,039,529 teaches the use of aqueous polyacrylamide solutions to increase the viscosity of the injected fluid, thereby promoting increased sweep efficiency. U. S. Pat. No. 3,581,824 teaches the use of polysaccharides for the same purpose. Polymers which are useful for increasing the viscosity of the injected fluid are effective but they are generally quite expensive, and since substantial quantities are required, the economics of such supplemental recovery programs are frequently a deterrent to their more wide-spread use. It has been observed that the commonly used viscosity increasing polymers adsorb on the formation rock, and this would tend to decrease the efficiency of the material and increase the cost of any such program.

The above described problems have been recognized to those skilled in the art of oil recovery. The use of certain compounds as sacrificial chemicals to pretreat the formation in order to decrease the adsorption of subsequently injected surfactant is known. For example, U. S. Pat. No. 3,414,054 discloses the use of aqueous solutions of pyridine, U. S. Pat. No. 3,469,630 teaches the use of sodium carbonate and inorganic polyphosphates, and U. S. Pat. No. 3,437,141 discloses the use of soluble carbonates, inorganic polyphosphates and sodium borate in combination with a saline solution of a surfactant having both a high and a low molecular weight component followed by a saline solution of the low molecular weight component of the surfactant. These materials have not been completely satisfactory from a standpoint of performance and economics.

SUMMARY OF THE INVENTION

The invention provides a method for recovering petroleum from petroleum-containing subterranean formations having injection means and producing means completed therein, comprising first injecting through the injection means into the subterranean formation a sacrificial inorganic material, namely a water soluble salt of a strong mineral acid having an oxygen containing anion, in sufficient quantity to be adsorbed on the formation rock and to occupy substantially all of the adsorption sites of the rock contained in the subterranean formation, followed by injecting through the injection means into the subterranean formation a surfactant solution, and thereafter injecting through the injection means into the subterranean formation the drive fluid, which is commonly water, whereby the oil is displaced through the subterranean formations to the surface of the earth through the production means.

DESCRIPTION OF THE SPECIFIC EMBODIMENTS

In carrying out this invention, a sacrificial inorganic material is injected through an injection means comprising one or more injection wells, into a subterranean petroleum-containing formation to substantially occupy or cover all potential adsorption sites of the rock within the subterranean formation, thereby reducing the extent of adsorption of the more expensive surfactant injected therebehind.

The most important characteristics for a satisfactory sacrificial inorganic material are:

1 that it be less expensive than the surfactant,
2 that it be adsorbed readily by the subterranean formation matrix, and
3 that the presence of such adsorbed sacrificial material adsorbed on the formation retards or eliminates the subsequent adsorption of surfactant on the adsorption sites of the formation rock.

By adsorption sites of the formation rock is meant those parts of the surfaces of the pores of the formation rock capable of adsorbing a chemical compound from a solution on contact.

The sacrificial inorganic materials do not themselves have any appreciable affect on the recovery efficiency of water flooding operations. Additional oil can be recovered only if the sacrificial material is followed by a surfactant solution which will effectively increase the amount of oil which is displaced from the subterranean formation pores. Ordinarily, flooding water is injected through conventional injection means and into the subterranean formation behind the surfactant solution to displace the oil and surfactant toward the production means, and then to the surface of the earth.

The surfactant for use in such a supplemental recovery program should be injected into the subterranean formation ahead of the flooding water, thereby achieving the desired low interfacial tension between the injected fluid and the displaced fluid. The surfactant may be present in a hydrocarbon solvent or in an aqueous solution, or in a combination thereof. Any type of surfactant may be used in the practice of this invention, although we have found non-ionic surfactants such as ethoxylated substituted phenols to be especially preferable. The surfactant used in the experimental work described hereinafter in this specification is a non-ionic surfactant, specifically a 9.5 mole ethylene oxide adduct of nonyl phenol.

The amount of surfactant which must be employed in the practice of this invention will ordinarily vary with various reservoir parameters, but generally will range from 0.01 to 0.1 pore volumes of an aqueous surfactant solution having dissolved therein from 0.001 to 0.5 percent by weight of the surfactant. A small amount of the preflush of sacrificial inorganic material may also be added to the surfactant solution to aid further in preventing the adsorption of the surfactant on the formation matrix. Sodium chloride may also be added to the surfactant solution for the same purpose.

In carrying out this invention, a sacrificial inorganic material is injected via suitable injection means, i.e., through one or more injection wells completed in the subterranean hydrocarbon formation, so that the sacrificial inorganic material enters the formation ahead of the surfactant. The surfactant is then injected into the subterranean hydrocarbon containing formation, followed by the injection of water. By injecting the sacrificial inorganic material in this particular sequence, the sacrificial inorganic material adsorbs onto and occupies the sites existing in the matrix of the formation, thereby eliminating or substantially decreasing the tendency for the subsequently injected surfactant to adsorb onto the formation matrix surface. As mentioned above, the surfactant may also contain the sacrificial inorganic material, in addition to sodium chloride.

Both the sacrificial inorganic material and the surfactant may be injected into the subterranean hydrocarbon containing formation in an aqueous solution or in a nonaqueous solution such as a hydrocarbon solvent, depending on availability and other requirements. Economic considerations, however, often require that the materials be injected in aqueous solutions whenever possible.

The quantity of sacrificial inorganic material to be injected into the subterranean hydrocarbon containing formation in advance of the surfactant solution should be sufficient to occupy substantially all of the active sites of the formation matrix, in order to effect the maximum reduction in the amount of surfactant that would otherwise adsorb onto the surfaces of the formation. If less than this optimum amount is used, however, there will be a corresponding reduction in the adsorption of surfactant from the injected solution onto the formation matrix, although the amount of reduction will not be as great as in the case where the formation is completely saturated. Similarly, if more than the amount of sacrificial inorganic material necessary to occupy all of the active sites on the formation matrix is injected into the subterranean hydrocarbon containing formation, no reduction in oil displacement efficiency will result. The only detriment resulting from using excess sacrificial inorganic material would be an increase in the cost of operating the supplemental oil recovery program.

Ordinarily the preferred range of sacrificial inorganic material will vary with the thickness of the formation, the area of pattern to be swept, and to a degree by other formation characteristics. It is convenient to express the quantity of sacrificial inorganic material in terms of pounds of said material per acre foot of formation of the particular pattern which the injected fluid is expected to sweep. Ordinarily, from about 50 to about 500 pounds per acre foot of formation of the sacrificial inorganic material described in this specification would ordinarily be sufficient to prevent adsorption of surfactant from injected surfactant solution.

We have found that water soluble salts of strong mineral acids having an oxygen containing anion such as soluble nitrates, sulfates or phosphates are especially effective sacrificial inorganic materials for use as a preflush in the above described application. The sacrificial oxygenated anion salts are most conveniently injected in the form of an aqueous solution, and we have found that approximately 1 molar solutions of these materials are optimum concentrations to use. The concentration does not appear to be critical, however, since it is the total amount of sacrificial inorganic material which is injected that determines the effectiveness in preventing the adsorption of the subsequently injected surfactant. In the instance of using a 1 molar solution of sodium nitrate, sodium sulfate or sodium phosphate, from about 0.005 to about 0.1 pore volumes of solution should be injected into the formation prior to the injection of surfactant. Since the adsorptivity of reservoirs varies considerably depending on the type of formation and the type and amount of clamps that may be present in the formation, some knowledge of the formation may be necessary in order to determine the optimum amount of the above described compounds to be injected in order to achieve the maximum reduction in the amount of surfactant which will be subsequently adsorbed on the formation. If the subterranean petroleum containing formation matrix is a relatively clean, i.e., non-clay containing, sand or sandstone, the lower limits of the range given above may be used, whereas formations containing relatively larger amounts of clay may require substantially greater quantities of the sacrificial inorganic material to achieve the desired benefits.

The surfactant may be injected immediately following the injection of the aqueous preflush slug of sacrificial inorganic material or it may be desirable in the instance of using particular surfactants to separate the preflush slug from the surfactant slug by the injection of an inert fluid. It is usually most convenient to inject an aqueous solution of surfactant, and it may be desirable to include the above described sacrificial inorganic material in the surfactant solution, in a concentration approximately equal to the concentration of the originally injected slug. Injection of the surfactant solution may be continued as long as is desired, although economics generally dictate that such injection be terminated and that a more economical fluid such as water be injected thereafter to displace the surfactant slug and displaced oil through the reservoir.

Pre-treating the subterranean petroleum containing reservoir with these sacrificial inorganic materials is especially effective in reducing adsorption of non-ionic surfactants. Accordingly, an especially preferred embodiment of this invention involves injecting an aqueous slug of sodium nitrate, sodium sulfate or sodium phosphate followed by the injection of an aqueous solution of a non-ionic surfactant such as that previously described into the said formation, followed by injection of water.

While this invention has been described primarily as an improved method of conducting a surfactant-water flooding oil recovery program, it should be recognized that the same material is highly effective for inhibiting the adsorption of polymeric materials incorporated into the injection fluid for the purpose of increasing the viscosity of said fluid. For example, the aqueous solution of sodium nitrate, sodium sulfate or sodium phosphate may be used to pretreat a formation, followed by the injection of an aqueous solution of viscosity increasing polymer such as polyacrylamide. Since the pre-treatment with the sacrificial inorganic material inhibits the adsorption from solution of the polyacrylamide, the viscosity of the injected fluid will remain more constant throughout the displacement process.

The total effectiveness of the viscous flood will be improved by use of the preflush with sacrificial inorganic material.

The effectiveness of this invention for reducing the adsorption of surfactant on formation rock in surfactant water flooding operations is demonstrated by the following examples, which are presented by way of illustration and are not intended as limiting the spirit and scope of the invention as are defined hereinafter in the claims.

In order to test the adsorption of a non-ionic surfactant on sand, a column was filled with sieved 150–200 mesh silica sand which had been thoroughly washed to remove all fines. A weighed quantity of this sand was added to the column and the pore volume of the column was determined. If a preflush solution of sacrificial inorganic material was to be tested to determine the extent that it could decrease the adsorption of the surfactant, 100 ml. of a known concentration of this additive was passed through the column and followed by 25 milliliters of a known concentration of the surfactant previously described. Distilled water was passed through the column and samples of the effluent from the column were taken at intervals. Concentrations of surfactant were measured by spectrophotometry. In Table I, data are given indicating the extent of adsorption of surfactant on the sand when no preflush was used, and when the sand was pretreated with an aqueous solution of 1.0 molar sodium nitrate in Run 2, 1.0 molar sodium phosphate in Run 3, and 1.0 molar sodium sulfate in Run 4. Column II gives the pore volumes of water which were flowed through the sand to elute 60 percent of the surfactant. Column III gives the pore volumes of water which were passed through the column to elute 90 percent of the surfactant. Column IV gives the pore volumes of water which were passed through the column in order to elute 90 percent of the surfactant after the surfactant first appeared in the effluent. Those instances in which a larger quantity of surfactant were adsorbed on the sand are indicated by the necessity of passing greater quantities of water through the sand in order to elute a given amount of the surfactant.

Line 5 of Table I gives values calculated as the theoretical potential value, based on surfactant spreading and assuming that no adsorption occurred on a column of sand identical to that used in the experiment. Line 6 of Table I gives the results obtained on an identical column of sand using a sample of potassium permanganate on a column of sand which had been deactivated by saturating with potassium permanganate to eliminate spreading due to adsorption. Runs 5 and 6 represent the best possible results which could be obtained by using any preflush treatment. It can be seen from these data that sodium nitrate, sodium phosphate and sodium sulfate are extremely effective at reducing the adsorption of surfactant on the sand particle surfaces.

TABLE I

ADSORPTION DATA SURFACTANT ON SAND

| I Preflush | II Pore Volumes of Water to Elute 60% of Surfactant | III Pore Volumes of Water to Elute 90% of Surfactant | IV Pore Volumes of Water to Elute 90% of Surfactant After Appearance |
|---|---|---|---|
| 1. | 4.90 | 8.43 | 6.93 |
| 2. 1.0 molar sodium nitrate | 2.32 | 4.27 | 2.77 |
| 3. 1.0 molar sodium phos- | | | |

| | | | |
|---|---|---|---|
| phate | 2.28 | 4.10 | 2.60 |
| 4. 1.0 molar sodium sulfate | 2.08 | 4.52 | 3.02 |
| 5. Theoretical calculation | 1.36 | 1.67 | 0.96 |
| 6. 26 ppm. potassium permanganate | 1.42 | 1.75 | 0.97 |

Thus it can be seen that by injecting into a subterranean formation a small quantity of water soluble salts of strong mineral acids having an oxygen containing anion, such as water soluble nitrates, sulfates and phosphates, the amount of subsequently injected surfactant which is adsorbed onto the formation can be dramatically decreased. Since less surfactant is required for a flood, supplemental recovery techniques can be performed with improved economics. By preventing the adsorption of surfactant onto the formation surfaces, the concentration of surfactant may be maintained relatively constant throughout the progress of the supplemental recovery technique, whereby the oil recovery efficiency is improved.

Various embodiments and modifications of this invention are apparent from the foregoing description and examples, and further modifications will be apparent to those skilled in the art. These modifications are included within the scope of this invention as defined by the claims below.

We claim:

1. In a method of recovering oil from a subterranean petroleum containing formation wherein an aqueous surfactant solution, said surfactant being adsorbable by the formation rock is injected through injection means and fluids are recovered from production means, the improvement for preventing adsorption of surfactant by the formation rock which comprises injecting an aqueous solution of a water soluble salt of a strong mineral acid having an oxygen containing anion selected from the group consisting of sodium nitrate, sodium sulfate, sodium phosphate and mixtures thereof in an amount from at least about 50 to about 1,000 pounds per acre foot of formation to be swept, into said formation prior to the injection of said surfactant.

2. The method of claim 1 wherein the water soluble salt of a strong mineral acid having an oxygen containing anion is sodium nitrate.

3. The method of claim 1 wherein the water soluble salt of a strong mineral acid having an oxygen containing anion is sodium sulfate.

4. The method of claim 1 wherein the water soluble salt of a strong mineral acid having an oxygen containing anion is sodium phosphate.

5. The method of claim 1 wherein said water soluble salt of a strong mineral acid having an oxygen containing anion is injected in at least an amount sufficient to satisfy substantially all of the adsorption capacity of the formation rock.

6. The method of claim 1 wherein the water soluble salt of a strong mineral acid having an oxygen containing anion is in aqueous solution having a concentration of from 0.1 to about 2.0 molar.

7. The method of claim 1 wherein the water soluble salt of a strong mineral acid having an oxygen containing anion is injected as an aqueous solution of from about 0.8 to about 17.0 percent by weight sodium nitrate.

8. The method of claim 7. wherein from about 0.005 to about 0.10 pore volumes of aqueous sodium nitrate solution are injected into the formation.

9. The method of claim 1 wherein the water soluble salt of a strong mineral acid having an oxygen containing anion is injected as an aqueous solution of from about 1.5 to about 33.0 percent by weight of sodium phosphate.

10. The method of claim 9 wherein from about 0.005 to about 0.10 pore volumes of aqueous sodium phosphate solution are injected into the formation.

11. The method of claim 1 wherein the water soluble salt of a strong mineral acid having an oxygen containing anion is injected as an aqueous solution of from about 1.4 to about 28.0 percent by weight of sodium sulfate.

12. The method of claim 11 wherein from about 0.005 to about 0.10 pore volumes of aqueous sodium sulfate solution are injected into the formation.

13. The method of claim 1 wherein the water soluble salt of a strong mineral acid having an oxygen containing anion is in aqueous solution which also contains sodium chloride.

14. The method of claim 1 wherein the surfactant is in an aqueous solution which additionally contains the salt of a strong mineral acid having an oxygen containing anion.

* * * * *